US012552644B2

(12) United States Patent
Kleewein et al.

(10) Patent No.: US 12,552,644 B2
(45) Date of Patent: Feb. 17, 2026

(54) TRANSPORT UNIT AND METHOD FOR TRANSPORTING A MOVING WALKWAY

(71) Applicant: INVENTIO AG, Hergiswil (CH)

(72) Inventors: Gerhard Kleewein, Pressbaum (AT); Dominik Praxmarer, Vienna (AT); Kurt Streibig, Rekawinkel (AT)

(73) Assignee: INVENTIO AG, Hergiswil (CH)

( * ) Notice: Subject to any disclaimer, the term of this patent is extended or adjusted under 35 U.S.C. 154(b) by 712 days.

(21) Appl. No.: 17/923,198

(22) PCT Filed: Apr. 16, 2021

(86) PCT No.: PCT/EP2021/059905

§ 371 (c)(1),
(2) Date: Nov. 3, 2022

(87) PCT Pub. No.: WO2021/223980

PCT Pub. Date: Nov. 11, 2021

(65) Prior Publication Data

US 2023/0242333 A1 Aug. 3, 2023

(30) Foreign Application Priority Data

May 7, 2020 (EP) .................................... 20173473

(51) Int. Cl.
*B65B 31/00* (2006.01)
*B65D 88/12* (2006.01)
(Continued)

(52) U.S. Cl.
CPC .............. *B66B 31/00* (2013.01); *B65D 88/12* (2013.01); *B65D 90/0073* (2013.01); *B66B 23/00* (2013.01)

(58) Field of Classification Search
CPC ......... B66B 21/00; B66B 23/00; B66B 31/00; B65D 88/12; B65D 90/0073
See application file for complete search history.

(56) References Cited

U.S. PATENT DOCUMENTS

| | | | | |
|---|---|---|---|---|
| 8,011,682 | B2 * | 9/2011 | Klein | B66B 31/00 198/326 |
| 10,737,909 | B2 * | 8/2020 | Gartner | B66B 23/12 |
| 2018/0002143 | A1 | 1/2018 | Matheisl et al. | |

FOREIGN PATENT DOCUMENTS

| | | |
|---|---|---|
| CN | 101205043 A | 6/2008 |
| CN | 103101829 A | 5/2013 |

(Continued)

OTHER PUBLICATIONS

International Search Report for International Application No. PCT/EP2021/059905 dated Jun. 18, 2021.

*Primary Examiner* — Gene O Crawford
*Assistant Examiner* — Keith R Campbell
(74) *Attorney, Agent, or Firm* — Knobbe, Martens, Olson & Bear, LLP

(57) ABSTRACT

A transport unit for transporting a moving walkway includes moving walkway modules and holding frames. The moving walkway modules each have a supporting structure portion designed to support a guide rail portion, a forward pallet belt portion, and a return pallet belt portion. Each holding frame has horizontal struts spaced apart and parallel to one another and vertical struts holding the horizontal struts at opposite ends. A holding frame is arranged at positions spaced apart such that one of the moving walkway modules rests on one of the horizontal struts and the vertical struts extend on opposite sides of the moving walkway modules.

17 Claims, 6 Drawing Sheets

(51) Int. Cl.

| | |
|---|---|
| ***B65D 90/00*** | (2006.01) |
| ***B66B 23/00*** | (2006.01) |
| ***B66B 31/00*** | (2006.01) |

(56) References Cited

FOREIGN PATENT DOCUMENTS

| | | | | |
|---|---|---|---|---|
| CN | 108840213 | A | | 11/2018 |
| JP | 2543945 | B2 | | 10/1996 |
| JP | 2013121881 | A | * | 6/2013 |

* cited by examiner

TRANSPORT UNIT AND METHOD FOR TRANSPORTING A MOVING WALKWAY

TECHNICAL FIELD

The present application relates to a transport unit and to a method for transporting a moving walkway.

SUMMARY

Moving walkways are used as passenger transport systems for conveying people in buildings or structures. In this case, a moving walkway is permanently integrated in a building after it has been installed. A transport belt in the form of a pallet belt that can be driven by a drive extends between an entry point at a first end of the moving walkway and an exit point at an opposite end of the moving walkway. Passengers can be transported by means of the pallet belt along a forward run of a displacement path of the pallet belt. The pallet belt usually comprises a plurality of mostly planar pallets, mostly made of metal, which are coupled to one another, for example, by means of a conveyor chain, so as to be able to bear tensile loads. During its movement along the displacement path in the region of the forward run, the pallet belt is typically supported and/or guided by guide rails. The guide rails are supported by a supporting structure, which is formed, for example, from a framework-like structure consisting of many interconnected struts. The supporting structure thus serves to support the weight of the pallet belt as well as any passengers who are on it. When the exit point is reached, the pallets of the pallet belt are then deflected and conveyed back to the entry point along a return path. The entry point and the exit point can be on the same or only slightly different levels, such that the displacement path extends horizontally or at a slight incline.

Components of a moving walkway are typically manufactured by a manufacturer of the moving walkway, for example, in said manufacturer's factory. The components then have to be transported to a target building in which the moving walkway is to be installed. Since a fully assembled moving walkway has considerable dimensions, after complete assembly in the factory it is usually divided into sections at the separation points provided for this purpose and the individual sections are packaged, loaded onto semitrailers and transported to the place of use. However, this method has the disadvantage that the individual sections have a large volume with a relatively low net weight, such that a lot of air and little material has to be transported with too many trucks. JP 2543945 A1, for example, describes such a transport method for packaging and transporting an escalator.

Another possibility is to package the components individually or in various smaller units and then, for example, transport them to the place of use or the target building using several trucks. This can result in considerable outlay for packaging and transporting the plurality of components. There may also be a risk of components being damaged during packaging and/or during transport.

There may be a need to transport a moving walkway with relatively little effort and/or safely, e.g., in particular to be able to transport it from the place of manufacture to a target building.

Such a need can be met by a transport unit and a method according to the independent claims. Advantageous embodiments are defined in the dependent claims and the following description.

According to a first aspect of the application, a transport unit for transporting a moving walkway is described, which transport unit has a plurality of moving walkway modules and a plurality of holding frames. At least two of the moving walkway modules are designed as moving walkway central part and each have a supporting structure portion. The supporting structure portion is configured to receive and support a guide rail portion, a forward pallet belt portion and a return pallet belt portion. The moving walkway modules are designed to be coupled to one another one behind the other in a longitudinal direction in order to form at least one load-bearing structure of a portion of the moving walkway. The moving walkway modules are arranged in the transport unit in a plurality of levels one above the other in a vertical direction extending transversely to the longitudinal direction. Each holding frame has a plurality of horizontal struts spaced apart in the vertical direction and extending parallel to one another and at least two vertical struts holding the horizontal struts at opposite ends. A holding frame is configured and arranged in each case at positions spaced apart in the longitudinal direction in such a way that in each case one of the moving walkway modules rests on one of the horizontal struts and the vertical struts extend on opposite sides of the moving walkway modules so as to be laterally adjacent to the moving walkway modules.

In other words, in a completed transport unit the moving walkway modules arranged one above the other, on the one hand, are mechanically connected to one another by the holding frames of the transport unit and, on the other hand, the holding frames of the transport unit are mechanically connected to one another by the moving walkway modules.

According to a second aspect of the application, a method for transporting a moving walkway is described which has at least the following method steps, not necessarily in the specified order:

- providing a plurality of moving walkway modules;
- providing horizontal struts and vertical struts for forming a plurality of holding frames; and
- arranging the moving walkway modules in a plurality of levels one above the other in a vertical direction in order to form a transport unit.

In this case, at least two of the moving walkway modules are designed as a moving walkway central part and each have a supporting structure portion, the supporting structure portion being designed to hold a guide rail portion, a forward pallet belt portion and a return pallet belt portion. The moving walkway modules are designed to be coupled to one another one behind the other in a longitudinal direction in order to form at least a portion of a load-bearing structure of the moving walkway. During the arrangement of the moving walkway modules, the horizontal struts and vertical struts are combined to form holding frames such that each holding frame has a plurality of horizontal struts spaced apart in the vertical direction and extending parallel to one another and at least two vertical struts holding the horizontal struts at opposite ends. A holding frame is configured and arranged in each case at positions spaced apart in the longitudinal direction in such a way that in each case one of the moving walkway modules rests on one of the horizontal struts and the vertical struts extend on opposite sides of the moving walkway modules so as to be laterally adjacent to the moving walkway modules.

Possible features and advantages of embodiments of the application may be considered, inter alia and without limiting the application, to be dependent upon the concepts and findings described below.

Embodiments of the transport unit described herein or of the corresponding transport method are intended to be able to transport a moving walkway from a first location, such as a manufacturing location, to a second location, such as a place of use, with as little effort as possible. The entire moving walkway can be divided into moving walkway modules. All or at least several of these moving walkway modules can be combined in one or more transport units. Each individual transport unit can thus be transported easily and safely. For example, a transport unit can be dimensioned such that it can be transported in a transport container with standardized dimensions.

In order to be able to transport the entire moving walkway in one transport unit or preferably distributed over several transport units, the moving walkway is divided into a plurality of moving walkway modules. While the entire moving walkway can generally have very large dimensions, e.g., in particular a large length of up to a few tens of meters, and thus can hardly be transported in one piece, the individual moving walkway modules should only have a fraction of the length of the entire moving walkway. For example, the individual moving walkway modules should be only a few meters long, e.g., for example, shorter than ten meters. Preferably, all moving walkway modules that are to be accommodated together in a transport unit should have substantially the same length, e.g., the length of the moving walkway modules should differ, for example, by less than 20%, preferably less than 10%. In particular, the dimensions of the individual moving walkway modules can be selected such that the entire transport unit fits into a container with standard dimensions, for example, a 20' container in accordance with ISO standard 668. Accommodated in such a container, the transport unit can then simply be loaded and transported by various means of transport such as ships, trains or trucks.

The moving walkway modules of a moving walkway can be designed in different ways. In particular, the moving walkway can have moving walkway modules which are designed as a moving walkway central part. Such a moving walkway central part is arranged in the finished moving walkway between moving walkway end parts on which, for example, a drive is provided at one end of the moving walkway and a clamping station is provided at an opposite end of the moving walkway. The moving walkway central part serves, among other things, to absorb the net weight of the moving walkway and, for example, loads caused by it, and to transfer it to the building.

The moving walkway central part or such moving walkway modules can have a supporting structure portion for this purpose. Such a supporting structure portion can be composed of a plurality of supporting components such as struts, bars or the like, the components being connected to one another in a load-bearing manner. For example, the supporting structure portion can be designed as a type of framework. Such a framework can have a three-dimensional structure made up of upper chords, lower chords, transverse bars, upright bars, diagonal bars, etc. The plurality of supporting structure portions or moving walkway modules comprising same can be arranged in a row in the longitudinal direction thereof and connected to one another in order to be able to form a supporting structure for the entire moving walkway.

The moving walkway module can have not only a supporting structure portion which is designed to receive a guide rail in the fully assembled moving walkway, but can also comprise a guide rail portion, a forward pallet belt portion and a return pallet belt portion. The guide rail portion is a part of a guide rail which, in the fully assembled moving walkway, extends substantially along the entire length of the movement range of the moving walkway and which is used to support and/or guide pallets of a continuous pallet belt during the displacement thereof along the movement range. The entire pallet belt circulating in the form of a closed ring is composed of a plurality of pallets arranged one behind the other in the circumferential direction. For this purpose, the pallets are connected to one another and/or, for example, to a conveyor chain, in order to be able to be displaced circumferentially together. In a forward region, in the case of such a circumferential displacement the pallet belt is moved from an entry region to an exit region of the moving walkway, with passengers standing on the pallets being able to be transported along the movement range of the moving walkway. At the entry region and at the exit region, the pallet belt is deflected, such that a return region of the pallet belt can be displaced in the opposite direction to the forward region. The entire pallet belt with its forward region and its return region can be formed by coupling a plurality of forward pallet belt portions and return pallet belt portions.

Provisions can be made on each of the moving walkway modules in order to be able to connect the moving walkway modules to one another after the transport in order to be able to build the entire moving walkway or at least a supporting structure of the moving walkway therefrom. For this purpose, the moving walkway modules can, for example, have connection units and/or contact surfaces by means of which adjacent moving walkway modules can be attached to one another and then connected to one another in order to be able to transfer the loads acting on the individual moving walkway modules to adjacent moving walkway modules and/or ultimately to the building when the moving walkway is subsequently used. Moving walkway modules can be designed such that they can be coupled to one another in the longitudinal direction in order to form at least a portion of a load-bearing structure of the moving walkway. Specifically, several supporting structure portions can be connected to one another in the longitudinal direction so that they can be mechanically load-bearing, in order to form the supporting structure or at least one section of the supporting structure of the moving walkway. Further moving walkway modules, for example, in the form of a deflection drive station and/or a deflection tensioning station, can be coupled to opposite ends of such an assembly. As already mentioned, a moving walkway module can also have guide rail portions as well as a forward pallet belt portion and a return pallet belt portion. A moving walkway provided with such moving walkway modules has a guide rail composed of guide rail portions and a pallet belt composed of a plurality of forward pallet belt portions and a plurality of return pallet belt portions.

In order to form the transport unit, the plurality of moving walkway modules can be arranged one above the other on a plurality of different levels. In other words, the different levels each extend in relation to a vertical direction which extends transversely, e.g., in particular perpendicularly, to the longitudinal direction of the moving walkway modules, one above the other, e.g., at different heights. Each level forms a kind of compartment in which one of the moving walkway modules is accommodated. The moving walkway modules are thus arranged virtually stacked one on top of the other within the transport unit, although the various moving walkway modules preferably do not make direct contact with one another, e.g., do not bear directly on one another.

Instead, a holding structure consisting of a plurality of holding frames is provided to accommodate the various moving walkway modules. The holding frames thus form the compartments on the various levels in which the moving walkway modules are to be accommodated. For this purpose, the holding frames are designed such that they can absorb the weight of each of the moving walkway modules. In addition, the holding frames are preferably also designed such that they can secure the moving walkway modules against slipping horizontally.

For this purpose, each holding frame has a plurality of horizontal struts spaced apart in the vertical direction and extending substantially parallel to one another and at least two vertical struts holding the horizontal struts at opposite ends. In this case, the horizontal struts extend in horizontal planes and are spaced apart from one another at different heights. A vertical distance between adjacent horizontal struts can be sufficiently large to be able to accommodate one of the moving walkway modules therebetween. The horizontal struts are held at their opposite ends by at least one of the vertical struts in each case. For this purpose, the ends of the horizontal struts can be coupled to the particular vertical strut so as to be mechanically load-bearing. Such a coupling is preferably carried out in a reversible manner, for example, by means of screw connections, split pins, quick-release fasteners or the like. The horizontal struts and vertical struts can be designed, for example, with profiles that can bear high mechanical loads, such as metal profiles, in particular steel profiles. Such profiles can be designed, for example, as a T-profile, L-profile, U-profile, H-profile or the like.

In the case of the transport unit, at least two holding frames are arranged at positions spaced apart in the longitudinal direction. In other words, the two holding frames are spaced apart from one another in the longitudinal direction of the transport unit. The holding frames are configured in such a way that each of the moving walkway modules rests on one of the horizontal struts of the two holding frames. In other words, each moving walkway module loads on at least two horizontal struts of at least two horizontally spaced holding frames. The vertical struts of the holding frames extend on opposite sides of the moving walkway modules so as to be laterally adjacent to the moving walkway modules. In other words, the vertical struts extend in the vertical direction, one vertical strut in each case extending along one of the opposite sides of the moving walkway modules. The vertical struts extend from a region below the lowermost moving walkway module to a region above the uppermost moving walkway module of the transport unit.

In order to design the holding frames accordingly and to arrange the moving walkway modules on top of one another therein, according to an embodiment of the transport method described herein the holding frame can be built up successively and the plurality of moving walkway modules can be arranged successively in the holding frame. When the moving walkway modules are arranged in the plurality of levels one above the other, a first of the moving walkway modules can be placed in each case on first horizontal struts of two horizontally spaced holding frames. A vertical strut can be attached beforehand or subsequently at opposite ends of the two first horizontal struts. A second horizontal strut can then be attached to each vertical strut above the first moving walkway module for each of the two holding frames. A second of the moving walkway modules can then be placed on each of the second horizontal struts of the two holding frames. If necessary, the described level-like attachment of horizontal struts and arrangement of moving walkway modules on these horizontal struts can be carried out more than twice in order to be able to store three, four or more moving walkway modules one above the other in the transport unit, for example.

According to one embodiment, the transport unit also has at least one end connection element. The end connection element is attached to an end, seen in the longitudinal direction, of one of the moving walkway modules. The end connection element is designed as a spacer in order to keep the moving walkway module connected thereto or the transport unit thereof within a container accommodating the transport unit at a distance from an opposing container wall or from another transport unit.

In other words, end connection elements that can act as spacers can be provided on the transport unit. By means of such end connection elements, a moving walkway module provided therewith can thus be kept at a distance from a container wall or optionally also from another moving walkway module which is accommodated in the same container, for example, as part of a further transport unit. If necessary, end connection elements can be provided at both opposite ends of a moving walkway module. In particular, one or more end connection elements can be provided on a lowermost moving walkway module in a transport unit.

In order to be able to act as a spacer, the end connection element can be adapted accordingly with regard to its structure, dimensions and stability. For example, the end connection element can be designed to be attached to one side of the moving walkway module. Furthermore, the end connection element can, for example, have a support surface on an opposite side in order to be able to be supported on the container wall or another moving walkway module or to be mechanically coupled thereto.

In order to form the transport unit, e.g., within the scope of the transport method described herein, each of the end connection elements can be attached to one end of one of the moving walkway modules in a reversible and releasable manner, e.g., temporarily screwed on, for example. After the transport unit has been transported, the end connection elements can be removed again before the moving walkway modules are connected to one another.

According to a specific embodiment, each of the end connection elements can each have an engagement opening and can be attached to the moving walkway module in such a way that the moving walkway module can be displaced in the longitudinal direction by engaging and pulling in the engagement opening.

In other words, the end connection element can be designed such that a pulling device can be temporarily coupled to the transport unit by means thereof in order to be able to move an individual moving walkway module of the transport unit or the entire transport unit in the longitudinal direction, e.g., horizontally. For example, the moving walkway module or the entire transport unit can be pulled horizontally out of a container in this way.

For this purpose, the end connection element can have an engagement opening, for example, in the form of a through-hole in a metal sheet or profile which forms the end connection element. The pulling device, e.g., a machine pulling a hook, for example, can engage in this engagement opening in order to be able to introduce the forces necessary for moving the moving walkway module or the transport unit. The engagement opening and the end connection element should be made sufficiently stable in order to be able to pull the entire moving walkway module or even the entire transport unit.

According to an embodiment, the transport unit or the moving walkway modules thereof each comprise at least one guide rail portion, a forward pallet belt portion, a return pallet belt portion and fastening means. Here, the guide rail portion is attached to the supporting structure portion and is configured, during a displacement movement of the forward pallet belt portion relative to the supporting structure portion, to guide the forward pallet belt portion parallel to the longitudinal direction. The forward pallet belt portion and the return pallet belt portion are fastened to the guide rail portion and/or to the supporting structure portion by means of the fastening means during transport of the transport unit.

In other words, the moving walkway modules in the transport unit can comprise not only the supporting structure portion; instead, the guide rail portions, forward pallet belt portions and return pallet belt portions can also be accommodated in the transport unit and transported together with the supporting structure portions.

The guide rail portions can possibly already be firmly connected to the associated supporting structure portion of a moving walkway module. In the fully assembled moving walkway, however, the pallet belt portions should be able to be displaced relative to the guide rails, e.g., they are generally not permanently connected to either the supporting structure portion or the guide rail portion. In order to temporarily secure said portions against unwanted displacement during the transport of the transport unit, in particular relative to the supporting structure portion and/or the guide rail portion, suitable fastening means are therefore provided, by means of which the pallet belt portions can be temporarily, reversibly and releasably fastened to the supporting structure portion or the guide rail portion. For this purpose, fastening means, for example, in the form of elastic and/or bendable connector elements, some of which are also referred to as clips, can be used. Such connector elements can be designed as loops, for example, which can span parts of a pallet belt portion and parts of a supporting structure portion or a guide rail portion and can thus fix these to one another. Fastening brackets, plates, high-strength cable ties, clamping claws and the like can also be used as fastening elements.

According to an embodiment, each of the vertical struts has a lifting structure at a vertically upper end, which lifting structure is configured such that by lifting all the holding frames on the lifting structures of the vertical struts thereof, the entire transport unit can be lifted.

In other words, the vertical struts can serve not only to hold or support the horizontal struts, but also to be able to use them to lift the entire transport unit. For this purpose, a lifting structure can be provided on each of the at least two vertical struts of the at least two holding frames. The lifting structure can be formed at a vertically upper end of the particular vertical strut. A geometry, dimensioning and stability of the lifting structure as well as a connection of the lifting structure to the rest of the vertical strut can be designed in such a way that, on the one hand, a suitable lifting tool, such as a crane, can interact with the lifting structures and, on the other hand, sufficient forces are exerted on the transport unit via the lifting structures to be able to lift the entirety thereof.

For example, the lifting structure can be designed as a simple through-opening in a carrier or profile forming the vertical strut. The through-opening can be sufficiently large to be able to insert, for example, the hook of a crane or a loop, chain or crane strap that interacts therewith. The lifting structure can thus be formed integrally with the vertical strut. Alternatively, however, the lifting structure can also be provided as separate components and temporarily or permanently connected to the vertical strut so as to be mechanically load-bearing.

According to an embodiment, lifting elements can be reversibly and releasably attached to the moving walkway modules in the transport method described herein, by means of which lifting elements each moving walkway module can be lifted in order to be able to be placed on associated horizontal struts of two holding frames in a provided level.

While the lifting structures mentioned above should be provided on the vertical struts of the holding frame and should serve to be able to lift the entire transport unit, the lifting elements should serve only to be able to lift individual moving walkway modules. The lifting elements are to be attached directly to the moving walkway modules. Since the lifting elements are only intended to be able to temporarily lift the moving walkway modules within the scope of the transport method described herein, but are not required for the later operation of the moving walkway, the lifting elements should be attached to the moving walkway modules in a reversible and releasable manner. For example, the lifting elements can be temporarily connected, for example, screwed, to components of the moving walkway modules, in particular to the supporting structure portion. Like the vertical struts, the lifting elements can be designed with metal sheets, profiles or the like that are sufficiently mechanically load-bearing. In turn, suitable structures such as engagement openings can be provided on the lifting elements, with which a lifting device such as a crane can interact in order to be able to lift the lifting elements including the moving walkway module attached thereto. In this way, while the transport unit is being assembled the moving walkway modules can be arranged and placed on the horizontal struts of the two holding frames arranged there on a level provided therefor.

According to an embodiment, each of the moving walkway modules can be reversibly and releasably coupled to at least one of the vertical struts and/or at least one of the horizontal struts.

In other words, a moving walkway module can not only be placed on the horizontal struts of the holding frame and thus be secured against lateral slipping only by a frictional connection with horizontal struts generated due to friction; instead, the moving walkway module can be mechanically coupled to the holding frame, e.g., to one of the horizontal struts and/or one of the vertical struts, e.g., connected by a positive fit. The mechanical coupling should be designed in such a way that in particular the lateral displacement of the moving walkway module relative to the holding frame can be prevented. For example, a component of the moving walkway module, such as the supporting structure portion, can be connected to a component of the holding frame so as to be mechanically load-bearing. In particular, such components can, for example, be reversibly and releasably screwed to one another or connected to one another by straps, loops, cable clamps, clamping claws or the like.

Specifically, according to an embodiment, each of the moving walkway modules can be reversibly and releasably coupled on opposite sides to at least one of the vertical struts. Because the moving walkway module is connected on opposite sides to the vertical struts extending there, an advantageous, uniform transmission of force between the moving walkway module and the holding frame can be achieved.

In a further embodiment of the transport unit, at least two of the moving walkway modules can be reversibly and releasably coupled to one another by supporting elements so as to support one another. By connecting the moving walkway modules to one another by means of support elements, the transport unit can be made more resistant to impacts and bending loads, such that the moving walkway modules protect one another in this way.

According to an embodiment, the transport unit can furthermore have a moving walkway module designed as a deflection drive module and/or as a deflection tensioning module. The deflection drive module is configured to deflect and drive a pallet belt of the moving walkway near one end of the moving walkway. The deflection tensioning module is configured to deflect and tension the pallet belt of the moving walkway near one end of the moving walkway.

In other words, in addition to the moving walkway modules designed as a moving walkway central part, the transport unit can have at least one moving walkway module designed in a different way.

In particular, such a moving walkway module can be designed as a deflection drive module. As such, it has on the one hand a deflection device by means of which the pallet belt can be deflected at the end of the travel path from the forward run to the return run or vice versa. Such a deflection device can be, for example, a deflection wheel. On the other hand, this moving walkway module has a drive by means of which the pallet belt can be actively displaced. Such a drive can be, for example, an electric motor that can drive the deflection wheel of the deflection device, for example.

Alternatively, the moving walkway module can be designed as a deflection tensioning module. In this case, it again has a deflection device and, in addition, a tensioning device by means of which the pallet belt can be kept mechanically under tension.

Deflection drive modules and deflection tensioning modules typically have different dimensions to moving walkway middle parts. In particular, deflection drive modules and deflection tensioning modules are usually significantly higher than the moving walkway central parts. Accordingly, a transport unit in which such a deflection drive module and/or deflection tensioning module is to be transported in addition to the moving walkway parts can have different dimensions and/or spacings in the holding frames used for this purpose with respect to the horizontal struts and/or vertical struts used. In particular, a compartment in which a deflection drive module and/or a deflection tensioning module is to be accommodated can be significantly higher than a compartment in which a middle part of the moving walkway central part is to be accommodated. Accordingly, a vertical distance between horizontal struts which delimit such a compartment can be greater than in the case of a compartment provided for a moving walkway central part.

In addition, deflection drive modules and/or deflection tensioning modules typically have a significantly higher weight than, for example, moving walkway central parts. Accordingly, it may be necessary to locally strengthen the holding frame in order to accommodate such heavy modules or to provide other measures in order to be able to absorb or distribute weight forces within the transport unit. For example, supplementary support elements can also be provided in the transport unit for this purpose, by means of which elements, for example, a heavy deflection drive module that is particularly sensitive to damage can be supported at least with part of its weight on a moving walkway central part arranged below. As already described above, by connecting the moving walkway modules to one another by means of support elements, the transport unit can be made more resistant to impacts and bending loads, such that the moving walkway modules protect one another in this way.

According to an embodiment, the transport unit can also comprise a transport monitoring module which is configured to detect accelerations and/or changes in position acting on the transport unit and to store information about same.

By means of the transport monitoring module, forces that act on the transport unit and cause accelerations and/or changes in position in the same can thus be identified. The transport monitoring module can have suitable sensors for this purpose, in particular acceleration sensors and/or position sensors. In particular, the transport monitoring module can be designed in a manner as described in an earlier patent application, EP 3 218 882 B1, filed by the applicant. The accelerations and/or changes in position detected by means of the transport monitoring module can be temporarily stored. For this purpose, the transport monitoring module can have a data store. At the same time or at a later point in time, the data provided by the transport monitoring module can be analyzed. For this purpose, the transport monitoring module can have a data processing unit, for example, having a processor.

By means of a data analysis, it is possible to identify, for example, if the transport unit was exposed to excessive acceleration during transport. Such accelerations can be the result of a collision or a fall of the transport unit. The data analysis can thus possibly be helpful to identify transport damage.

In the case of an advanced data analysis, it may even be possible to identify the way in which excessive accelerations that have occurred could have damaged components of the transport unit or of the moving walkway to be transported. For example, information regarding the excessive accelerations that have occurred can be used in order to be able to carry out analysis and/or simulations by means of a digital twin of the moving walkway, which can be used to identify possible transport damage. The digital twin represents a data set in which the physical properties of the real moving walkway are reproduced as precisely as possible and on the basis of which physical reactions to excessive accelerations can be analyzed or simulated.

The transport monitoring module can be attached to one of the holding frames, for example. Alternatively, the transport monitoring module can also be attached to one of the moving walkway modules. The transport monitoring module can be permanently or reversibly and releasably attached to the transport unit or to one of the holding frames.

According to an embodiment, an identification mark is provided on the holding frame which uniquely identifies the holding frame.

In other words, a marking can be provided on the holding frame by means of which the holding frame can be identified. Such an identification mark can preferably be read out automatically. For example, the identification mark can be designed as a barcode or QR code and read out optically by means of a scanner. Alternatively, the identification mark can also be designed as an RFID mark, for example, and can be read out by an electromagnetic signal.

In principle, the holding frame or the struts forming same can be provided as single-use parts, e.g., as disposable parts. After the transport unit has been transported, these parts can be used for other purposes, for example, on a construction site. However, it is also conceivable to use the holding frame or its struts repeatedly, in particular if they also comprise a transport monitoring module. For this purpose, tracking of these components and/or a type of deposit system can be set up. For example, each holding frame or even each individual one of its horizontal struts and/or vertical struts can be clearly identified using the identification marks. The identification marks can be registered. After a holding frame has been used, it can be sent back to a manufacturing plant or a sales organization, for example. It may further be the case that a moving walkway can be operated with its full functionality, for example, only when the holding frame thereof used and registered during transport has been returned to the manufacturer, for example.

It should be noted that some of the possible features and advantages of the application are described herein with reference to different embodiments of a transport unit according to the application on the one hand and a transport method on the other hand. A person skilled in the art recognizes that the features can be combined, adapted or replaced as appropriate in order to arrive at further embodiments of the application.

BRIEF DESCRIPTION OF THE DRAWINGS

Embodiments of the application will be described in the following with reference to the accompanying drawings, with neither the drawings nor the description being intended to be interpreted as limiting the application.

The drawings are merely schematic and not true to scale. Like reference signs refer to like or equivalent features in the various drawings.

DETAILED DESCRIPTION

Figure 1:
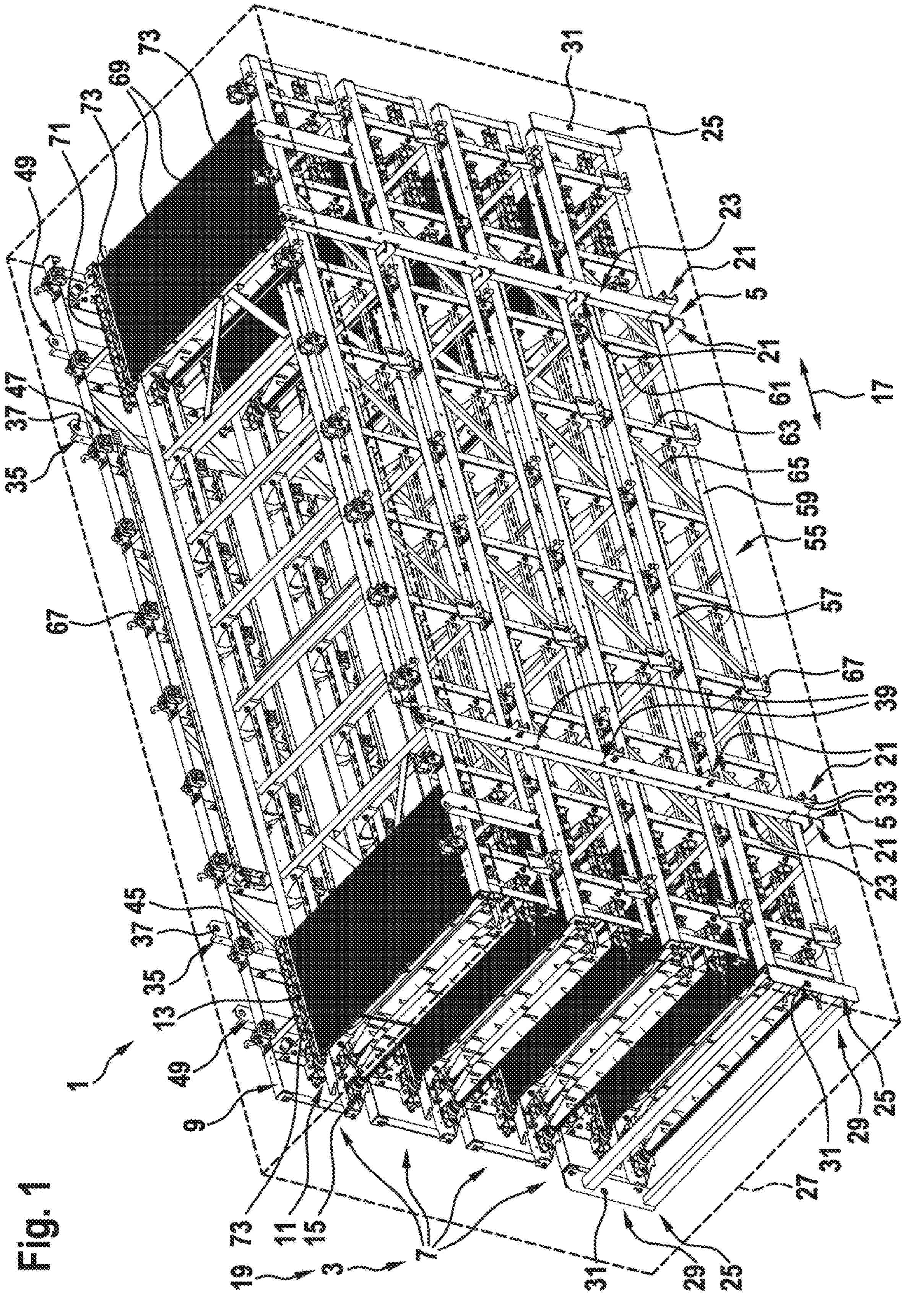
FIG. 1 is a perspective view of a transport unit according to an embodiment of the present application.
Figure 2:
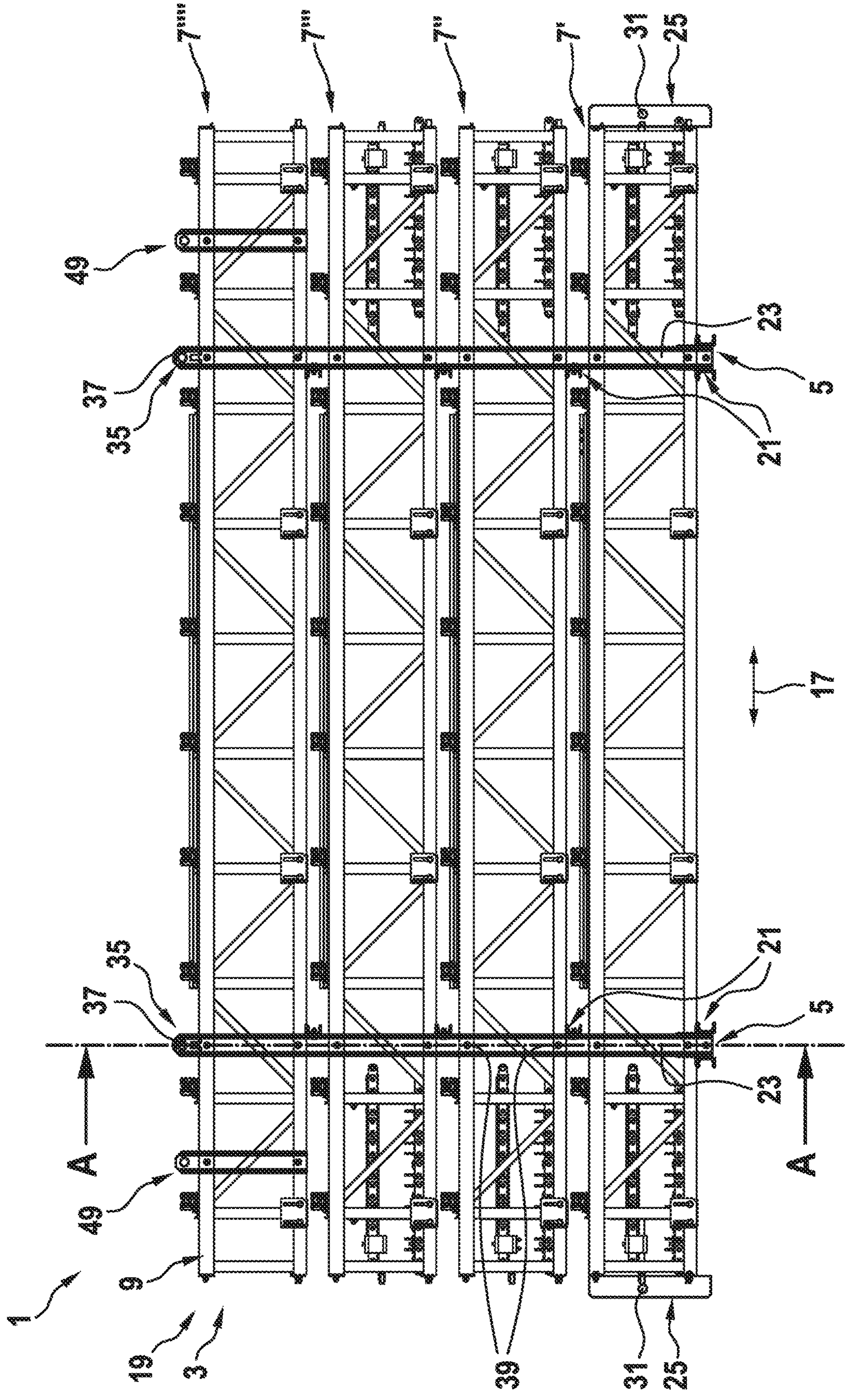
FIG. 2 is a side view of a transport unit according to an embodiment of the present application.

FIG. 1 is a perspective view of an exemplary transport unit 1, by means of which components of a moving walkway 19 can be transported. Details and possible designs of this exemplary transport unit 1 are shown in FIGS. 2 to 5.

In the example shown, the transport unit 1 comprises four moving walkway modules 3 and two holding frames 5. The moving walkway modules 3 are designed as moving walkway central parts 7. Each moving walkway central part 7 here comprises a supporting structure portion 9 on which a guide rail portion 11, a forward pallet belt portion 13 and a return pallet belt portion 15 are arranged. The moving walkway modules 3 extend parallel to a longitudinal direction 17. After transport using the transport unit 1, the moving walkway modules 3 can be assembled to form a moving walkway 19.

In the example shown, the supporting structure portion 9 is designed as a framework structure 55. This framework structure 55 comprises several upper chords 57, lower chords 59, transverse bars 61, upright bars 63 and diagonal bars 65. The various straps 57, 59 and bars 61, 63, 65 are made of steel profiles, for example, and are connected to one another in a load-bearing manner in order to form the framework 55. Connection elements 67 can also be provided on the supporting structure portion 9, by means of which other components, such as components of a moving walkway balustrade, can be attached to the supporting structure portion 9.

The pallet belt portions 13, 15 can have a plurality of pallets 69 which are arranged one behind the other in the longitudinal direction 17. The pallets 69 can be connected to one another and/or to a conveyor chain 71. The pallets 69 are held on the guide rail portion 11, such that a pallet belt composed as a whole of the pallets 69 can be guided by a guide rail composed of the guide rail portions 11.

Figure 7:
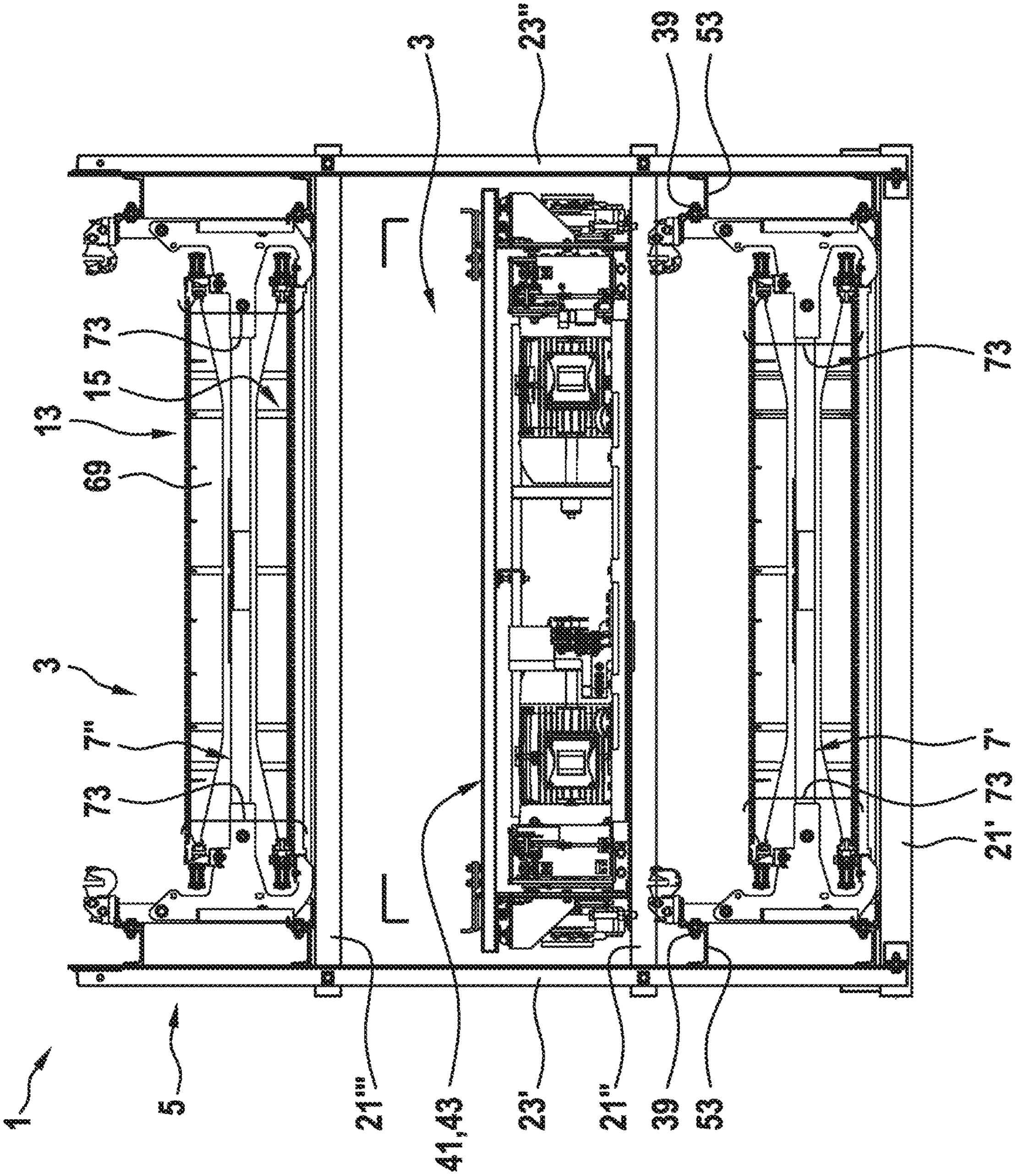
FIG. 7 is a sectional view along the plane B-B from FIG. 6.

In order to prevent the pallet belt portions 13, 15 from becoming detached from the guide rail portion 11 or the supporting structure portion 9 during transport, fastening means (or a fastener) 73 can be provided, by means of which the pallet belt portions 13, 15 can be temporarily attached to the guide rail portion 11 and/or the supporting structure portion 9 (clearly shown in FIG. 7, for example). The fastening means 73 can in particular prevent pallets 69 from moving relative to the supporting structure portion 9 and, for example, from slipping out of the guide rail portion 11. The fastening means 73 can be designed, for example, as loops or straps.

During transport, e.g., within the transport unit 1, the moving walkway modules 3 are arranged one above the other, e.g., stored one above the other in a plurality of levels or levels. The moving walkway modules 3 are held by the at least two holding frames 5.

Figure 4:
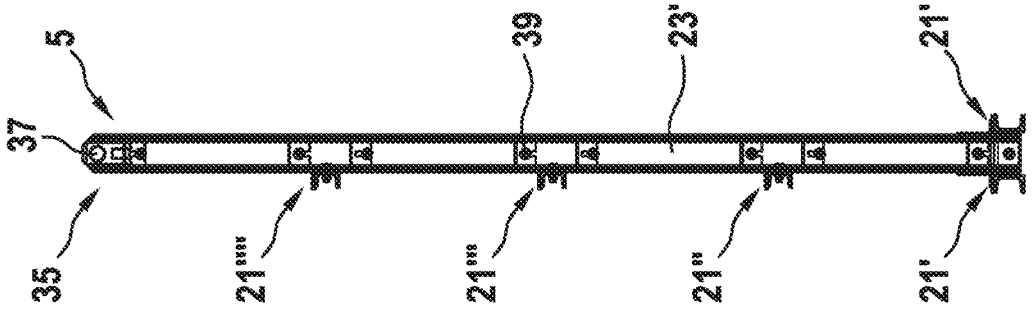
FIG. 4 is a side view of the holding frame from FIG. 3.
Figure 3:
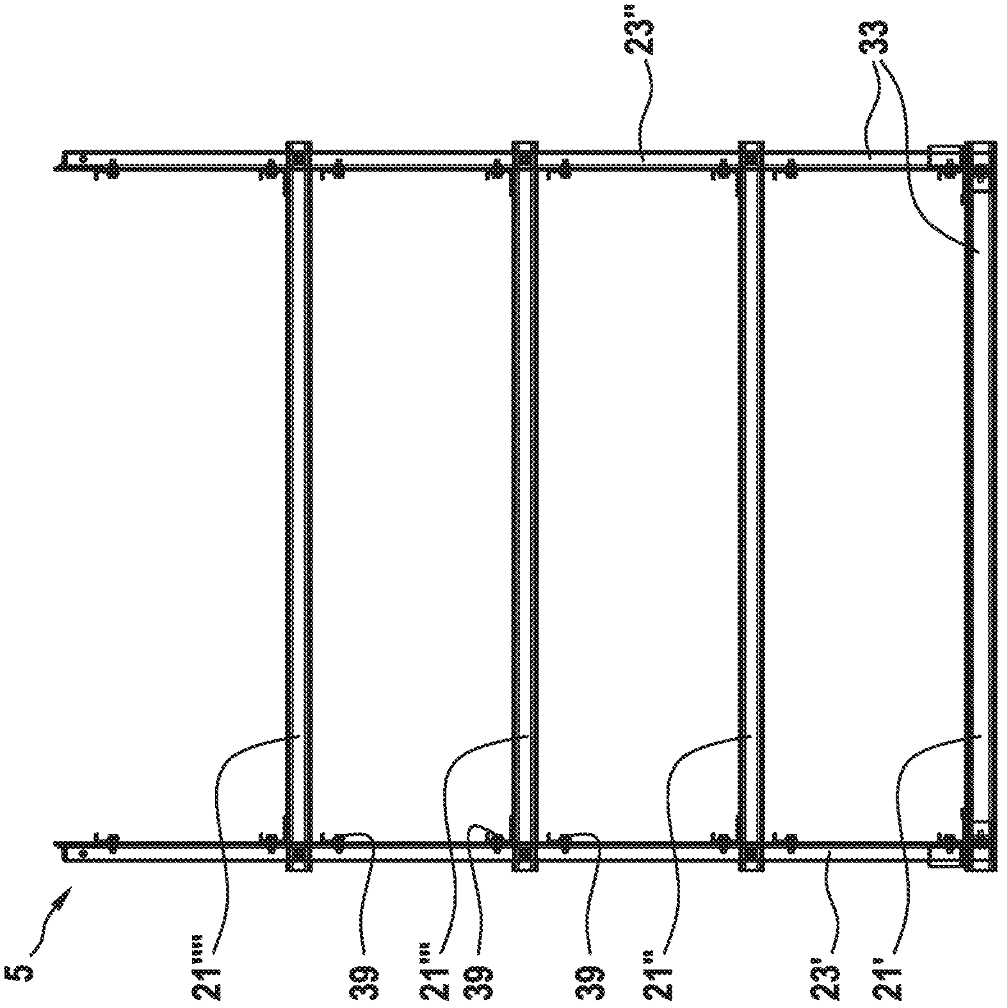
FIG. 3 is a front view of a holding frame of a transport unit according to an embodiment of the present application.
Figure 5:
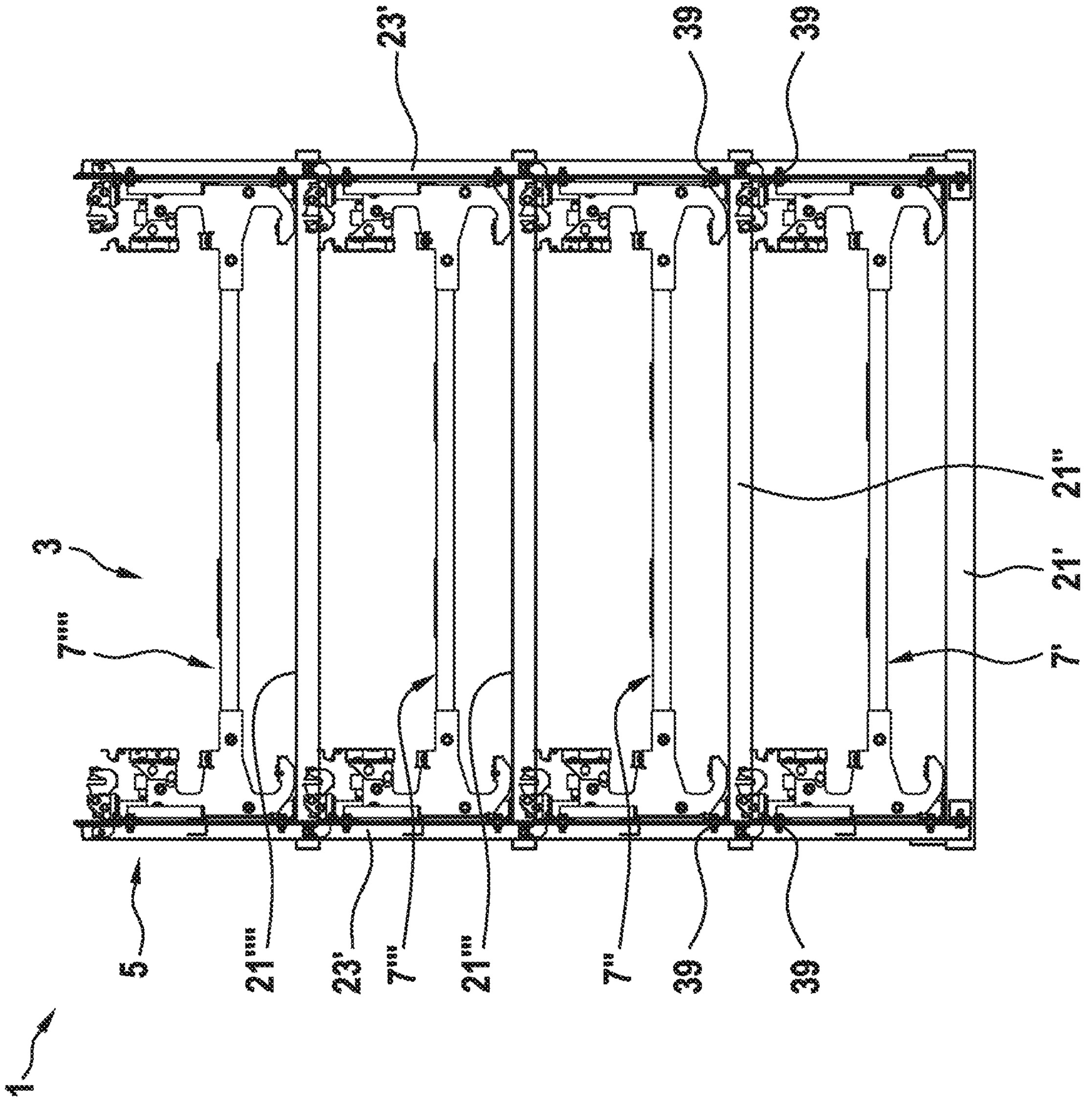
FIG. 5 is a sectional view along the plane A-A from FIG. 2.

For this purpose, as illustrated in particular in FIGS. 3 and 4, each of the holding frames 5 has a plurality of horizontal struts 21 and at least two vertical struts 23. In this case, the horizontal struts 21 and vertical struts 23 are formed with metal profiles 33. In the example shown, four horizontal struts 21', 21'', 21''', 21'''' are arranged vertically spaced apart from one another in different horizontal planes. A vertical distance between adjacent horizontal struts 21 is at least slightly greater than a height of the moving walkway modules 3 to be accommodated between the horizontal struts 21. Opposite ends of each of the horizontal struts 21 are each attached to one of the vertical struts 23. For example, the horizontal struts 21 and vertical struts 23 can be screwed together.

The transport unit 1 can be assembled in different ways or in different sequences. For example, a lowermost horizontal strut 21' can first be provided. A lowermost moving walkway central part 7' can then be placed on this horizontal strut 21' (illustrated by way of example in FIG. 5). A vertical strut 23', 23'' can then be attached to each of the opposite ends of the horizontal strut 21'. A further horizontal strut 21'' can then be attached to these vertical struts 23', 23' above the lowermost moving walkway central part 7'. The next moving walkway central part 7'' can then be placed on this further horizontal strut 21'', etc., until the entire transport unit 1 is assembled.

In order to be able to raise the moving walkway modules 3 during such loading of the transport unit 1, a plurality of lifting elements 49 can be attached to each moving walkway module 3. Such lifting elements 49 can be, for example, bars that can be temporarily connected to the supporting structure portion 9. The lifting elements 49 can then be lifted together with the moving walkway modules 3, for example, by means of a crane.

In order to prevent the moving walkway modules 3 from moving horizontally relative to the holding frame 5, it is also possible for the moving walkway modules 3 to be coupled to at least one of the vertical struts 23 and/or one of the horizontal struts 21. For example, the moving walkway modules 3 can be secured to one of these struts 21, 23 via screw connections 39 (illustrated in particular in FIG. 5).

After the moving walkway modules 3 have been arranged on the different levels of the transport unit 1, the entire transport unit 1, e.g., the two holding frames 5 including the moving walkway modules 3 arranged therein, can be loaded. For example, the entire transport unit 1 can be accommodated in a container 27 (shown in FIG. 1 only by broken lines for reasons of clarity). Such a container 27 is typically cuboid and is delimited by container walls 29. A single transport unit 1 can be accommodated in a single container 27. In the case of larger containers 27, a plurality of transport units 1 can also be accommodated in a single container 27.

In order to be able to load the transport unit 1 into a container 27 from above, for example, lifting structures 35 can be provided on the vertical struts 23. These lifting structures 35 can be designed in such a way that they can be used to lift all the holding frames 5 of the transport unit 1 together, for example, by means of a crane.

In the example shown, the lifting structures 35 are each designed as a through-opening 37 near an upper end of each of the vertical struts 23. A loop, for example, can be passed through such a through-opening 37, which loop can then be gripped and lifted by a crane hook.

In particular, in order to avoid the transport unit 1 moving within the container 27, e.g., being displaced relative to the container walls 29 and/or to another transport unit 1 accommodated in the container 27, end connection elements 25 can be provided. Such an end connection element 25 can be attached to an end, seen in the longitudinal direction 17, of one of the moving walkway modules 3. Such an end connection element 25 should preferably be attached to at least a lowermost moving walkway module 3 at one or preferably both opposite ends. The end connection elements 25 are designed and dimensioned such that the moving walkway module 3 can be supported on the container wall 29 or on an adjacent moving walkway module 3 via the end connection elements 25.

The end connection elements 25 can additionally be configured in order to be used to be able to move the entire transport unit 1 or at least one of the moving walkway modules 3 horizontally, for example, in order to be able to pull the transport unit 1 out of a laterally opened container 27. For this purpose, the end connection element 25 can have an engagement opening 31. A hook of a pulling machine can, for example, engage in this engagement opening 31, by means of which hook a sufficient tensile force can then be exerted on the moving walkway module 3 connected thereto via the end connection element 25.

Figure 6:
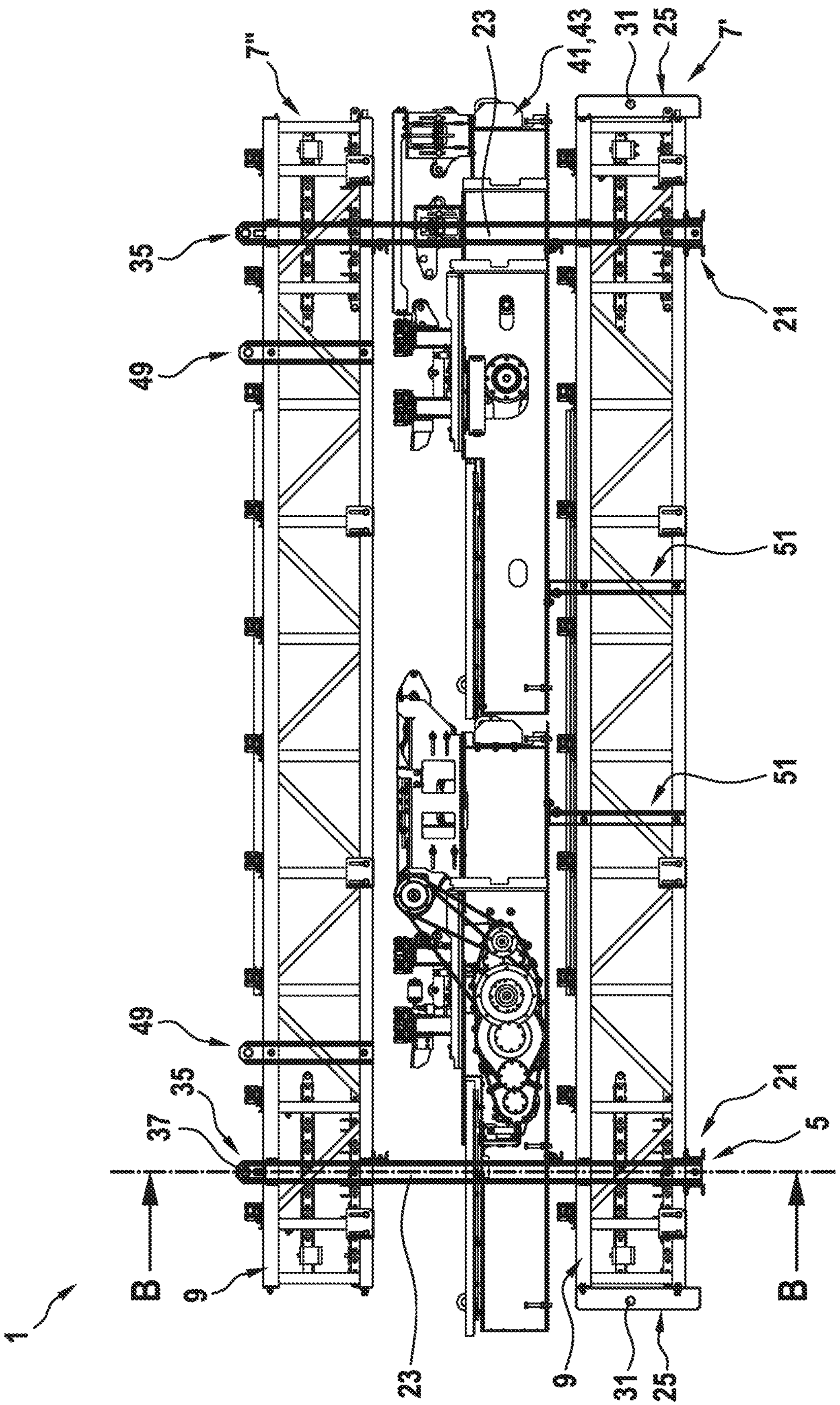
FIG. 6 is a side view of a transport unit according to a further embodiment of the present application.

Another possible embodiment of a transport unit 1 is shown in FIGS. 6 and 7. While four substantially identical moving walkway modules 3 in the form of moving walkway parts 7 were accommodated in the holding frame 5 in the embodiment shown in the preceding drawings, in the embodiment shown here different types of moving walkway modules 3 are arranged in the transport unit 1.

In the example shown, a different type of moving walkway module 3 in the form of a deflection drive module 41 or a deflection tensioning module 43 is accommodated in the transport unit 1 between a lower moving walkway module 3 designed as a moving walkway central part 7' and an upper moving walkway module 3 also designed as a moving walkway central part 7".

Such deflection drive modules 41 or deflection tensioning modules 43 generally have a significantly greater height than, for example, moving walkway central parts 7. Accordingly, a vertical distance between horizontal struts 21", 21'", which delimit the compartment in which the deflection drive module 41 or the deflection tensioning module 43 is to be accommodated, must be significantly greater than for accommodating moving walkway central parts 7 (illustrated in particular in FIG. 7).

In addition, the deflection drive modules 41 or deflection tensioning modules 43 can also have a greater width than the moving walkway central parts 7. A lateral distance between the vertical struts 23', 23" can thus be selected to be greater for this transport unit 1 than for a transport unit 1 in which only moving walkway parts 7 are to be accommodated. In order to still be able to secure the lower and upper moving walkway central part 7', 7" laterally to the vertical struts 23', 23", spacer elements 53 can be used (see FIG. 7).

In addition, deflection drive modules 41 or deflection tensioning modules 43 are usually significantly heavier than moving walkway central parts 7. In order to be able to absorb the heavy weight of such deflection drive modules 41 or deflection tensioning modules 43 or to be able to distribute said weight appropriately within the transport unit 1, additional support elements 51 can be provided in the transport unit 1 (see FIG. 6). By means of the support elements 51, one of the deflection drive modules 41 or deflection tensioning modules 43 can be supported, for example, downwards to a moving walkway middle part 7 below. The support elements 51 can be provided, for example, in a region in the longitudinal direction 17 between the holding frames 5. Correspondingly, such support elements 51 can also be used for moving walkway central parts 7 which are significantly shorter than the other moving walkway central parts 7, so that they can be attached to a holding frame 5 only at one end. The other end can be fastened via support elements 51 to the moving walkway central part 7 arranged below and/or above said end. Of course, it is also possible to fasten such a short moving walkway central part 7 completely to a longer moving walkway central part 7 and thus to connect it indirectly to the holding frame 5. By connecting the moving walkway modules 3 to one another by means of support elements 51, the transport unit 1 can be made overall even more resistant to impacts and bending loads, such that the moving walkway modules 3 or moving walkway central parts 7, deflection drive modules 41 and deflection tensioning modules 43 support and protect one another in this way.

In particular, in order to be able to detect transport damage that can be caused, for example, by a crash or a collision of the transport unit 1 during transport thereof, the transport unit 1 can also have a transport monitoring module 45 (shown schematically in FIG. 1). The transport monitoring module 45 can be provided on one of the holding frames 5, for example. The transport monitoring module 45 can use a sensor system to detect accelerations and/or changes in position acting on the transport unit 1. Data determined by the sensor system can be stored and/or processed in order to be able to derive information from this data, for example, regarding possible transport damage. For example, the information in the data regarding excessive accelerations that have occurred can be used in order to be able to determine any damaging effects of the accelerations that have occurred on the moving walkway 19 by means of a data set of a digital twin or double of the moving walkway 19 serving as a simulation environment.

In order to be able to establish the identity of a transport unit 1 or at least of the holding frame 5 inserted therein, identification marks 47 can be provided on the holding frame 5 (shown schematically in FIG. 1). Such identification marks can preferably be read out in an automated manner. The location of the holding frames 5, for example, can be tracked using the identification marks. This information can be used, for example, to create a motivation for sending the holding frames 5 back to a sender of the transport unit 1 after they have been used. For this purpose a type of deposit system, for example, can be set up. Alternatively, functionalities of the moving walkway can be activated only when the holding frames 5 have been returned.

Finally, it should be noted that terms such as “comprising,” “having,” etc. do not preclude other elements or steps and terms such as “a” or “an” do not preclude a plurality. Furthermore, it should be noted that features or steps that have been described with reference to one of the above embodiments may also be used in combination with other features or steps of other embodiments described above. Reference signs in the claims should not be considered to be limiting.

The invention claimed is:

1. A transport unit comprising:

a plurality of moving walkway modules of a moving walkway and a plurality of holding frames;

at least two of the moving walkway modules being configured as a moving walkway central part and each having a supporting structure portion, the supporting structure portion being configured to support a guide rail portion, a forward pallet belt portion, and a return pallet belt portion, wherein:

the moving walkway modules are configured to be coupled to one another one behind the other in a longitudinal direction in order to form at least one load-bearing structure of a portion of the moving walkway; and the moving walkway modules are arranged in the transport unit in a plurality of levels one above the other in a vertical direction extending transversely to the longitudinal direction;

each holding frame comprising a plurality of horizontal struts spaced apart in the vertical direction and extending parallel to one another and at least two vertical struts holding the horizontal struts at opposite ends, wherein:

each holding frame is configured and arranged at a position spaced apart in the longitudinal direction such that one of the moving walkway modules rests on one of the horizontal struts, and the vertical struts extend on opposite sides of the moving walkway modules so as to be laterally adjacent to the moving walkway modules; and at least one end connection element, the end connection element being attached to an end, seen in the longitudinal direction, of one of the moving walkway modules, the end connection element being configured as a spacer in order to keep the moving walkway module connected thereto and the transport unit within a container accommodating the transport unit at a distance from an opposite container wall or a further transport unit.

2. The transport unit of claim 1, wherein the end connection element comprises an engagement opening and is attached to the moving walkway module such that the moving walkway module can be displaced in the longitudinal direction by engaging in the engagement opening and pulling.

3. The transport unit of claim 1, wherein the moving walkway modules further comprise the guide rail portion, the forward pallet belt portion, the return pallet belt portion and at least one fastener, wherein:

the guide rail portion is attached to the supporting structure portion and is configured, during a displacement movement of the forward pallet belt portion relative to the supporting structure portion, to guide at least the forward pallet belt portion parallel to the longitudinal direction; and the forward pallet belt portion and the return pallet belt portion are fastened to at least one of the guide rail portion or to the supporting structure portion using the at least one fastener during transport of the transport unit.

4. The transport unit of claim 1, wherein each of the vertical struts has a lifting structure at a vertically upper end, the lifting structure configured such that by lifting all the holding frames on the lifting structures of the vertical struts thereof, the entire transport unit can be lifted.

5. The transport unit of claim 1, wherein each of the moving walkway modules is reversibly releasably coupled to at least one of the vertical struts or at least one of the horizontal struts or to at least one of the vertical struts on opposite sides.

6. The transport unit of claim 1, wherein at least two of the moving walkway modules are reversibly and releasably coupled to one another by supporting elements so as to support one another.

7. The transport unit of claim 1, further comprising at least one of the moving walkway modules configured as a deflection drive module or as a deflection tensioning module, wherein the deflection drive module is configured to deflect and drive a pallet belt of the moving walkway near one end of the moving walkway, and wherein the deflection tensioning module is configured to deflect and tension the pallet belt of the moving walkway near one end of the moving walkway.

8. The transport unit of claim 1, further comprising a transport monitoring module configured to detect accelerations or changes in position acting on the transport unit and to store information about the transport unit.

9. The transport unit of claim 1, wherein an identification mark is provided on the holding frame which uniquely identifies the holding frame.

10. A method for transporting a moving walkway, the method comprising:

providing a plurality of moving walkway modules;

providing horizontal struts and vertical struts for forming a plurality of holding frames;

arranging the moving walkway modules in a plurality of levels one above the other in a vertical direction in order to form a transport unit;

wherein:

at least two of the moving walkway modules are configured as a moving walkway central part and each comprises a supporting structure portion, the supporting structure portion configured to support a guide rail portion, a forward pallet belt portion, and a return pallet belt portion;

the moving walkway modules are configured to be coupled to one another one behind the other in a longitudinal direction in order to form at least one load-bearing structure of a portion of the moving walkway;

the horizontal struts and vertical struts are combined to form the holding frames during the arrangement of the moving walkway modules such that each holding frame comprises a plurality of the horizontal struts spaced apart in the vertical direction and extending parallel to one another and at least two of the vertical struts holding the horizontal struts at opposite ends, and the holding frames are configured and arranged at positions spaced apart in the longitudinal direction in such a way that one of the moving walkway modules rests on one of the horizontal struts and the vertical struts extend on opposite sides of the moving walkway so as to be laterally adjacent to the moving walkway modules, and at least one end connection element is attached to at least one end, seen in the longitudinal direction, of one of the moving walkway modules of a transport unit, the end connection element being configured as a spacer in order to keep the moving walkway module connected thereto and the transport unit within a container accommodating the transport unit at a distance from an opposite container wall or a further transport unit.

11. The method of claim 10, wherein:

when the moving walkway modules are arranged in a plurality of levels one above the other, a first of the moving walkway modules is placed on a first of horizontal struts of two horizontally spaced holding frames of the plurality of holding frames;

one of the vertical struts is attached at each of the opposite ends of both of the first horizontal struts;

a second horizontal strut is attached to each vertical strut above the first moving walkway module for each of the two holding frames; and a second of the moving walkway modules is placed on each of the second horizontal struts.

12. The method of claim 10, wherein lifting elements are reversibly and releasably attached to the moving walkway modules, by which the lifting elements of each moving walkway module can be lifted in order to be placed on the associated horizontal struts of two holding frames in a provided level.

13. The method of claim 11, wherein lifting elements are reversibly and releasably attached to the moving walkway modules, by which the lifting elements of each moving walkway module can be lifted in order to be placed on the associated horizontal struts of the two holding frames in a provided level.

14. The method of claim 10, wherein a transport monitoring module is arranged on the transport unit, the transport monitoring module is configured to detect accelerations or changes in position acting on the transport unit and to store information about the transport unit.

15. The method of claim 11, wherein a transport monitoring module is arranged on the transport unit, the transport monitoring module is configured to detect accelerations or changes in position acting on the transport unit and to store information about the transport unit.

16. The method of claim 12, wherein a transport monitoring module is arranged on the transport unit, the transport monitoring module is configured to detect accelerations or changes in position acting on the transport unit and to store information about the transport unit.

17. The method of claim 13, wherein a transport monitoring module is arranged on the transport unit, the transport monitoring module is configured to detect accelerations or changes in position acting on the transport unit and to store information about the transport unit.

* * * * *